Nov. 21, 1961  G. HEERKLOTZ  3,009,403
PHOTOGRAPHIC CAMERAS
Filed Dec. 28, 1959

Inventor
GÜNTER HEERKLOTZ
By Irwin S. Thompson
Attorney

United States Patent Office
3,009,403
Patented Nov. 21, 1961

3,009,403
PHOTOGRAPHIC CAMERAS
Günter Heerklotz, Dresden, Germany, assignor to VEB Kamera- und Kinowerke Dresden, Dresden, Germany
Filed Dec. 28, 1959, Ser. No. 862,370
3 Claims. (Cl. 95—10)

The present invention relates to a photographic camera with setting elements for diaphragm and exposure time, the relative positions of which can be selected by means of rotation of only one of the two setting elements and can read off against a counter-mark, it being possible to use as counter-marks, both so-called light-value scales and also follow-up pointers of exposure meters.

Arrangements of this type which have become known were equipped with couplings provided between the setting elements, to ensure a connection between the setting elements. For this purpose however special coupling means were necessary which inter alia possessed the disadvantage that if necessary the two setting elements could be adjusted independently of one another only after the disconnection of this coupling by a special operation.

The object of the invention is to overcome this disadvantage and an embodiment suitable above all for the requirements of interchangeability of lenses.

In accordance with the invention this is achieved due to the fact that the setting element provided for the setting of the afore-mentioned relative position is coupled with a compensating ring through a cam guide and the said compensating ring is coupled with the other setting element through a rectilinear guide. The compensating ring is here preferably coupled with a drive ring carrying the pivot positions of the diaphragm blades, so that the compensating ring at the time constitutes the transmission means for the diaphragm values to be supplied to the lens, which may be interchangeable. Furthermore the compensating ring is expediently connected with an axially movable spindle, which is coupled through a rectilinear guide with the said other setting element and through a cam guide with the follow-up pointer of an exposure meter. A marker disc for film sensitivities or filter factors is preferably rotatable in relation to the other setting element and arranged for securing in various relative positions, its toothing meshing with a pinion of the spindle.

Further details of the invention may be seen from the following example of embodiment.

Figure 2:
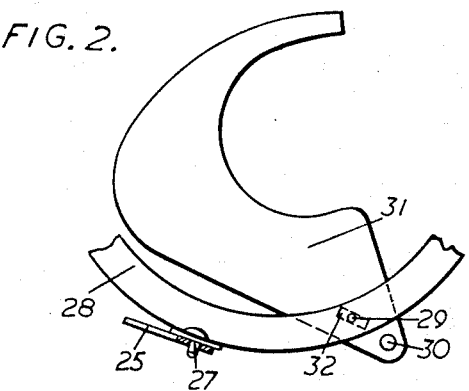
Figure 1:
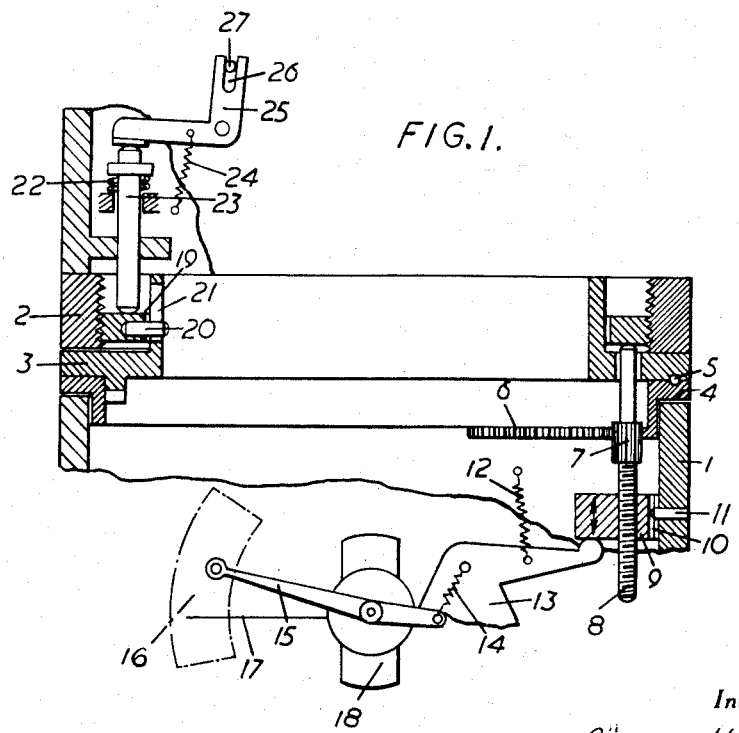

FIGURE 1 shows the setting mechanism, and
FIGURE 2 a diaphragm blade of an ordinary diaphragm arrangement.

Around the front, cylindrical, housing part of the camera 1 there are rotatably mounted the diaphragm setting element 2 and the time setting element 3, the marker ring 4 being rotatable in relation to the time setting element 3 and securable by means of catches 5. With the toothing 6 of the marker ring 4 there meshes the pinion 7 of the threaded spindle 8, which is screwed together with the threaded slide block 9. The threaded slide block 9 bears under the action of the spring 12 on the cam lever 13, which in turn is operatively connected with the follow-up pointer 15 as a result of the spring 14. The pointer 17 of the meter 18 is visible in the window 16.

The initially mentioned diaphragm setting element 2 possesses internal threading, into which the externally threaded compensating ring 19 is screwed. The pin 20 of the compensating ring 19 extends into the slot 21 of the time setting element 3, whereby a rectilinear guidance is produced. The diaphragm push-rod 23 presses under the action of the spring 22 against a plane face of the compensating ring 19, and the threaded spindle 8 bears by virtue of the action of the spring 12 upon the other plane face.

Through the spring 24 the diaphragm push-rod 23 is connected with the bell-crank lever 25, the slot 26 of which extends around the pin 27 provided on the diaphragm drive ring 28 (see FIGURE 2). The pins 29 provided on the diaphragm drive ring 28 in known manner drive the diaphragm blades 31 which swing about the pivot points 30. For the sake of simplicity only one part is illustrated in each case.

The manner of operation of the arrangement is as follows:

Due to the threaded connection between the diaphragm setting element 2 and the compensating ring 19 on the one hand and the pin-slot guide 20, 21 between the compensating ring 19 and the time-setting element 3 on the other hand, on rotation of the diaphragm setting element 2 firstly exclusively an axial movement of the compensating ring 19 takes place. This movement is transmitted through the push-rod 23 to the bell-crank lever 25 and thence through the pin-slot connection 27, 26 to the diaphragm drive ring 28, which, through the further pin-slot connection 29, 32, pivots the diaphragm blades 31 about their pivot point 30. Because this adjustment of the diaphragm aperture takes place, while the exposure time remains unchanged, the ratio of diaphragm and exposure time, that is to say the set light value, varies consequently, this value being visible both on a light-value scale (not shown especially but sufficiently known) and also through the follow-up pointer.

If the variation of the diaphragm values is not sufficient to achieve the desired light value, then—after the diaphragm setting element 2 has reached the end of the diaphragm range—the pin 20 moving axially together with the compensating ring 19 will strike against one end of the slot 21 and prevent a further axial movement of the compensating ring 19. Instead now the time setting element 3 is entrained in the same direction. Thus now the diaphragm aperture retains its extreme position (minimum or maximum diaphragm aperture) as a result of the end position reached by the compensating ring 19, and the exposure time is varied.

In order also to be able to transmit variations of the exposure time to the follow-up pointer 15, with the time setting element 3 there is coupled the marker ring 4 having a toothed segment 6, which ring is rotatable preferably in relation to the time setting element 3 and is securable in various relative positions by means of catches 5. This toothed ring 4 is constructed as marker ring and can serve for the consideration of further exposure factors, such for example as film sensitivity or filter factors. The toothed segment 6 of the marker ring 4 meshes with the pinion 7 of the threaded spindle 8. This threaded spindle is screwed through a threaded slide block 9, the slot 10 of which is guided rectilinearly by the pin 11 seated firmly in the housing 1. By rotation of the time setting element 3 and thus of the toothed marker ring 4 the pinion 7 is rotated and thus also is the spindle 8, whereby an axial movement of the threaded slide block 9 takes place.

Because the cam lever 13 is operatively connected with the threaded slide block 9 under the action of the spring 12, all movement of this slide block is transmitted through the cam lever 13 to the follow-up pointer 15 pressing constantly on the cam lever 13 under the action of the spring 14. The said follow-up pointer is visible in a manner known per se in a window 16, together with the pointer 17 of a meter 18.

I claim:
1. In a photographic camera comprising a housing, an aperture diaphragm mounted on the optical axis of the camera, a diaphragm aperture setting ring opera- tively connected to said diaphragm and coaxial therewith, a shutter device mounted within the housing, an exposure time setting ring coaxial with the diaphragm setting ring and operatively connected to said shutter device, an exposure meter having a moving coil and a pointer connected to said coil, and a follow-up pointer pivotally mounted within the housing; the provision of a compensating ring mounted in the housing and coaxial with said diaphragm aperture and exposure time setting rings and coupled to one of said setting rings so as to be axially movable thereby, a rectilinear coupling arrangement provided between said compensating ring and the other setting ring whereby the latter and the compensating ring are rotatable together and axially movable with respect to one another, a first movable element in engagement with one side of the compensating ring for transmitting axial movement thereof to the diaphragm whereby the aperture is predetermined, a second movable element in engagement with the other side of the compensating ring for transmitting axial movement thereof to the follow-up pointer, whereby the follow-up pointer is adjustable, and means connected between the second movable element and said other setting means whereby on movement of the latter the follow-up pointer is additionally adjustable.

2. In a photographic camera comprising a housing, an aperture diaphragm mounted on the optical axis of the camera, a diaphragm aperture setting ring operatively connected to said diaphragm and coaxial therewith, a shutter device mounted within the housing, an exposure time setting ring coaxial with the diaphragm setting ring and operatively connected to said shutter device, an exposure meter having a moving coil and a pointer connected to said coil, and a follow-up pointer pivotally mounted within the housing; the provision of a compensating ring mounted in the housing and coaxial with said diaphragm aperture and exposure time setting rings and coupled to said diaphragm setting ring so as to be axially movable thereby, a rectilinear coupling arrangement provided between said compensating ring and the exposure time setting ring whereby the latter and the compensating ring are rotatable together and axially movable with respect to one another, a first axially movable rod in engagement with one side of the compensating ring for transmitting axial movement thereof to the diaphragm whereby the aperture is predetermined, a second axially movable rod in engagement at one end with the other side of the compensating ring, a slide block having a threaded bore which is engaged by the other end of said second rod which is similarly threaded, means for guiding said slide block and preventing rotation thereof, a lever pivotally mounted in the housing and spring-urged at one end thereof into engagement with said slide block and in engagement at the other end thereof with the follow-up pointer, a marker ring mounted concentrically with the exposure time ring and drivably connected with the latter and having a toothed segment internally thereof, and a pinion fixed to said second rod and being in engagement with said toothed segment.

3. In a photographic camera comprising a housing, a plurality of diaphragm blades forming an aperture diaphragm pivotally mounted on the camera housing, a diaphragm blade driving ring having a series of driving pivots engaging in slots provided in the blades, a diaphragm aperture setting ring operatively connected to said diaphragm blade driving ring and coaxial therewith, a shutter device mounted within the housing, an exposure time setting ring coaxial with the diaphragm setting ring and operatively connected to said shutter device, an exposure meter having a moving coil and a pointer connected to said coil, and a follow-up pointer pivotally mounted within the housing; the provision of a compensating ring mounted in the housing and coaxial with said diaphragm aperture and exposure time setting rings and coupled to said diaphragm setting ring so as to be axially movable thereby, a rectilinear coupling arrangement provided between said compensating ring and the exposure time setting ring whereby the latter and the compensating ring are rotatable together and axially movable with respect to one another, a first axially movable rod in engagement at one end with one side of the compensating ring, a pivoted bell crank lever spring-urged with one arm against the other end of said rod and with the other arm in driving connection with the diaphragm driving ring, a second axially movable rod in engagement at one end with the other side of the compensating ring, a slide block having a threaded bore which is engaged by the other end of said second rod which is similarly threaded, means for guiding said slide block and preventing rotation thereof, a further bellcrank lever pivotally mounted in the housing having one arm thereof spring-urged into engagement with said slide block and the other arm in engagement with the follow-up pointer, a marker ring mounted concentrically with the exposure time setting ring and drivably connected with the latter and having a toothed segment internally thereof, and a pinion fixed to said second rod and being in engagement with said toothed segment, said pinion being axially slidable in the teeth.

References Cited in the file of this patent
UNITED STATES PATENTS 2,360,256     Mihalyi _____ Oct. 10, 1944

OTHER REFERENCES (German application), Gauthier, 1,036,045, printed August 7, 1958.

(German application), Braun, 1,040,367, printed October 2, 1958.